(12) United States Patent
Sakurai et al.

(10) Patent No.: US 11,740,762 B2
(45) Date of Patent: Aug. 29, 2023

(54) EQUIPMENT MANAGEMENT APPARATUS AND EQUIPMENT MANAGEMENT SCREEN GENERATING METHOD

(71) Applicant: TOSHIBA CARRIER CORPORATION, Kawasaki (JP)

(72) Inventors: Koichiro Sakurai, Shizuoka (JP); Hidemitsu Kawai, Shizuoka (JP); Ryusuke Ikeda, Tokyo (JP); Hiroto Yoshihara, Chiba (JP)

(73) Assignee: TOSHIBA CARRIER CORPORATION, Kawasaki (JP)

( * ) Notice: Subject to any disclaimer, the term of this patent is extended or adjusted under 35 U.S.C. 154(b) by 0 days.

(21) Appl. No.: 17/893,497

(22) Filed: Aug. 23, 2022

(65) Prior Publication Data

US 2022/0404954 A1 Dec. 22, 2022

Related U.S. Application Data

(63) Continuation of application No. PCT/JP2020/008035, filed on Feb. 27, 2020.

(51) Int. Cl.
*G06F 3/04817* (2022.01)
*G06F 3/0482* (2013.01)
*G06F 3/04847* (2022.01)
*G06T 3/40* (2006.01)
*G06T 11/00* (2006.01)

(52) U.S. Cl.
CPC ........ *G06F 3/04817* (2013.01); *G06F 3/0482* (2013.01); *G06F 3/04847* (2013.01);
(Continued)

(58) Field of Classification Search
CPC .............. G06F 3/04817; G06F 3/0482; G06F 3/04847; G06T 3/40; G06T 11/00;
(Continued)

(56) References Cited

U.S. PATENT DOCUMENTS

2010/0031153 A1* 2/2010 Ortwein ................. G06F 9/542
715/733
2013/0123992 A1 5/2013 Ishizaka
(Continued)

FOREIGN PATENT DOCUMENTS

CN 102855070 A 1/2013
CN 108140235 A 6/2018
(Continued)

OTHER PUBLICATIONS

Office Action dated Oct. 28, 2022, in corresponding Indian Patent Application No. 202247052293 (with English Translation), 8 pages.
(Continued)

*Primary Examiner* — Cesar B Paula
*Assistant Examiner* — John M Heffington
(74) *Attorney, Agent, or Firm* — Oblon, McClelland, Maier & Neustadt, L.L.P.

(57) ABSTRACT

A display displays an equipment management screen in which icons indicating equipment devices and having a first display size are superimposed on a floor configuration diagram of a building at positions corresponding to installation sites of the equipment devices. A display information generator, upon detection of an operation of specifying display of a group to which the equipment device corresponding to the operated icon belongs, identifies all equipment devices belonging to the specified group, changes display sizes of icons corresponding to the identified equipment devices to a second display size larger than the first display size, displays operation buttons for implementing settings of the identified equipment devices at prescribed positions on the equipment management screen in a superimposed manner, and changes display sizes of icons corresponding to equipment devices not belonging to the speci-
(Continued)

fied group to a third display size smaller than the first display size.

5 Claims, 9 Drawing Sheets CPC ................ *G06T 3/40* (2013.01); *G06T 11/00* (2013.01); *G06T 2200/24* (2013.01)

(58) Field of Classification Search
CPC ..... G06T 2200/24; F24F 11/523; F24F 11/52; H04Q 9/00
See application file for complete search history.

(56) References Cited

U.S. PATENT DOCUMENTS

| 2013/0307992 | A1* | 11/2013 | Erlandsson | ............. | G06F 16/58 348/164 |
| 2014/0236325 | A1* | 8/2014 | Sasaki | ................... | G06F 3/0488 700/90 |
| 2017/0109940 | A1 | 4/2017 | Guo et al. | | |
| 2018/0239510 | A1* | 8/2018 | Green | ................... | G06F 3/0482 |

FOREIGN PATENT DOCUMENTS

| CN | 109028515 A | 12/2018 |
| JP | 2008-191879 A | 8/2008 |
| JP | 2009-134469 A | 6/2009 |
| JP | 2016-018397 A | 2/2016 |
| JP | 2019-186874 A | 10/2019 |
| WO | WO 2012/023297 A1 | 2/2012 |

OTHER PUBLICATIONS

International Search Report dated Mar. 31, 2020 in PCT/JP2020/008035 filed on Feb. 27, 2020, 2 pages.

* cited by examiner

FIG. 3

| GROUP NAME | CORRESPONDING AIR CONDITIONERS |
|---|---|
| STORE A | 10-1 to 10-5 |
| STORE B | 10-6 to 10-10 |
| STORE C | 10-11 to 10-15 |
| 1ST FLOOR CENTER AISLE AREA | 10-16 to 10-18 |
| 1ST FLOOR WEST AISLE AREA | 10-19 to 10-21 |
| ... | ... |

EQUIPMENT MANAGEMENT APPARATUS AND EQUIPMENT MANAGEMENT SCREEN GENERATING METHOD

CROSS-REFERENCE TO RELATED APPLICATIONS

The present application is a continuation of International Application No. PCT/JP2020/008035, filed on Feb. 27, 2020, the entire contents of which are incorporated herein by reference.

FIELD

Embodiments described herein relate to an equipment management apparatus and an equipment management screen generating method.

BACKGROUND

A lot of equipment devices are usually installed in large buildings such as commercial facilities and office buildings, and those equipment devices are managed centrally by a central management apparatus which is an equipment management apparatus. The central management apparatus sequentially obtains and stores operating state information from the respective equipment devices.

A manager is able to perform operations of monitoring the operating state information of the equipment devices and changing setting information, using the central management apparatus. In order to perform these operations, a manager displays an equipment management screen which uses a floor configuration diagram in a building, on a liquid crystal display of the central management apparatus. In the equipment management screen, icons indicating the equipment devices are superimposed on the floor configuration diagram at the positions corresponding to the installation sites of the equipment devices. By specifying the icon of the desired equipment device on the equipment management screen, the operating state information of the desired equipment device is displayed. A manager is able to perform management work for the equipment devices by confirming the operating state information and changing the setting information with respect to the displayed equipment device. The central management apparatus also may be capable of communicating with an operation terminal with which the manager of the equipment devices performs equipment management, and the operation terminal may be used as an equipment management apparatus by allowing the operation terminal to perform displays and operations similar to the central management apparatus on a screen of the operation terminal.

BRIEF DESCRIPTION OF DRAWINGS

FIG. 3 illustrates an example of device classification information stored in the controller serving as the equipment management apparatus according to the embodiment.

DETAILED DESCRIPTION

Figure 1:
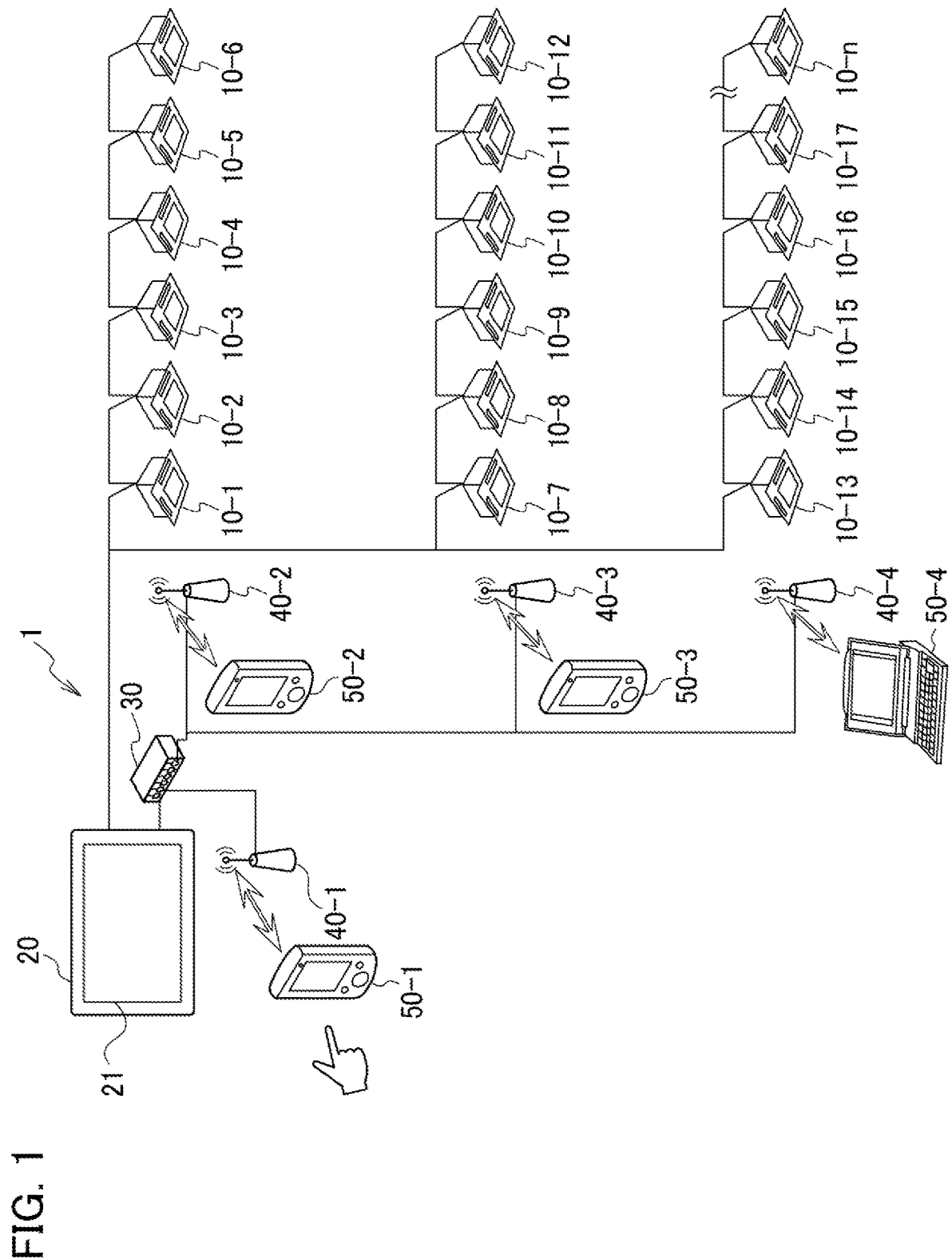
FIG. 1 is an overall view of a configuration of an air conditioning system using an equipment management apparatus according to an embodiment.

According to one embodiment, an equipment management apparatus includes a display, an operation detector, a device classification information storage, and a display information generator. The display is configured to display an equipment management screen in which icons indicating equipment devices and having a first display size are superimposed on a floor configuration diagram of a building at positions corresponding to installation sites of the equipment devices. The operation detector is configured to detect an operation on the equipment management screen displayed on the display. The device classification information storage is configured to store device classification information in which the equipment devices are classified into groups. The display information generator is configured to, upon detection by the operation detector of an operation of one of icons indicating the equipment devices on the equipment management screen displayed on the display, change a display size of the operated icon from a first display size to a second display size larger than the first display size, and display an operation button for implementing settings of the equipment device at a prescribed position on the equipment management screen in a superimposed manner, and upon detection by the operation detector of an operation of specifying display of a group to which the equipment device corresponding to the operated icon belongs, identify all equipment devices belonging to the specified group based on the device classification information stored in the device classification information storage, change display sizes of icons corresponding to the identified equipment devices to the second display size, display operation buttons for implementing settings of the identified equipment devices at prescribed positions on the equipment management screen in a superimposed manner, and change display sizes of icons corresponding to equipment devices not belonging to the specified group to a third display size smaller than the first display size.

A description will be hereinbelow provided for an air conditioning system according to embodiments of a communication system by referring to the drawings.

Configuration of Air Conditioning System Using Equipment Management Apparatus According to Embodiment As an equipment management apparatus according to an embodiment, a description will be provided for the configuration of an air conditioning system using a controller as a central management apparatus and a tablet terminal, by referring to FIG. 1. An air conditioning system 1 according to the embodiment includes: air conditioners 10-1 to 10-n installed in a building; a controller 20 serving as a central management apparatus connected to the air conditioners 10-1 to 10-n; wireless communication access points 40-1 to 40-n connected to the controller 20 via a hub 30; a tablet terminal 50-1 wirelessly connected to the access point 40-1; a tablet terminal 50-2 wirelessly connected to the access point 40-2; a tablet terminal 50-3 wirelessly connected to the access point 40-3; and a personal computer 50-4 wirelessly connected to the access point 40-4. The controller 20, the tablet terminals 50-1 to 50-3, and the personal computer 50-4 are operated by a manager of the air conditioning system 1. In the air conditioning system, the air conditioners 10-1 to 10-n installed in the building correspond to equipment devices.

Figure 2:
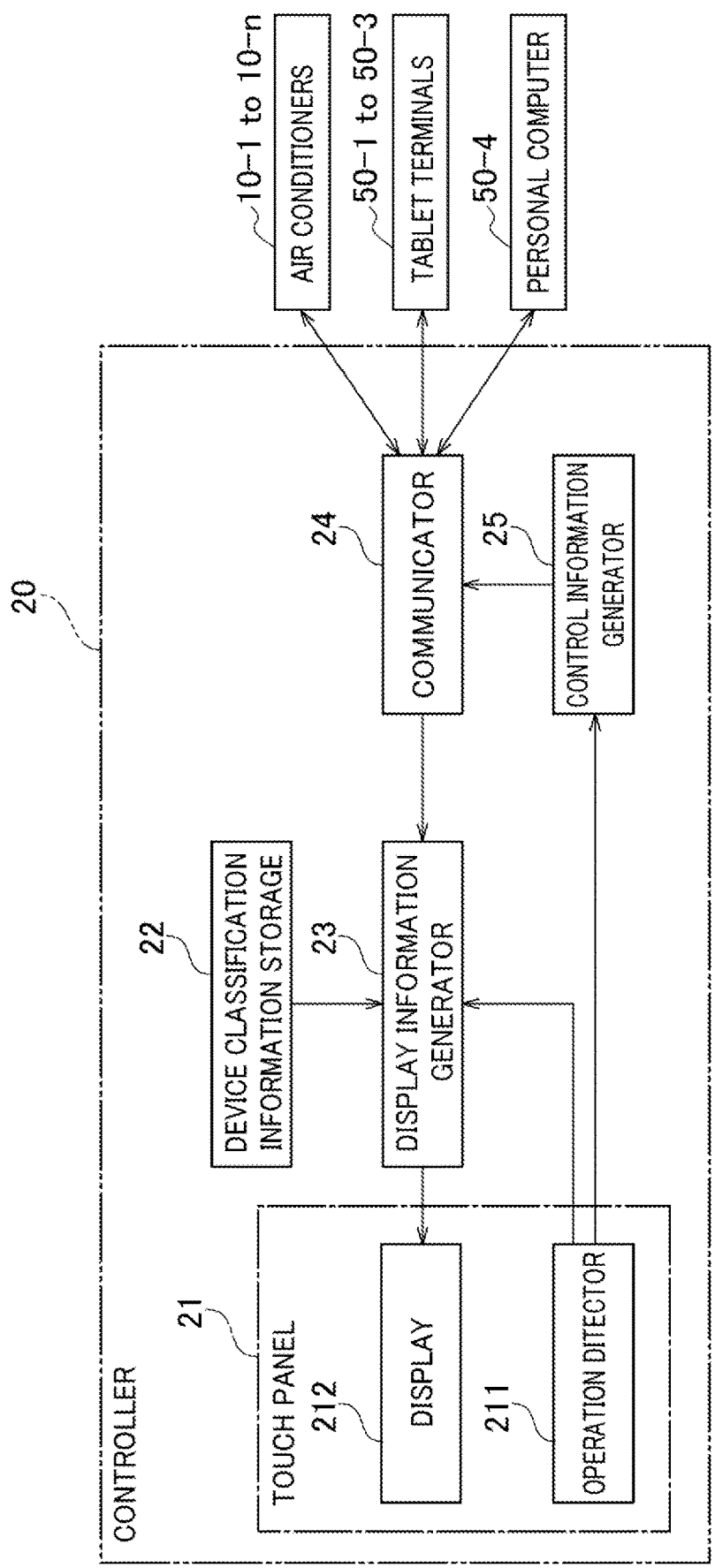
FIG. 2 is a block diagram of a configuration of a controller serving as the equipment management apparatus according to the embodiment.

As illustrated in FIG. 2, the controller 20 includes: a touch panel 21 with a liquid crystal display screen, a device classification information storage 22, a display information generator 23, a communicator 24, and a control information generator 25.

The touch panel 21 includes an operation detector 211 and a display 212. The operation detector 211 detects a touch operation by the manager. The display 212 displays display information provided to the manager.

The device classification information storage 22 stores device classification information in which the air conditioners 10-1 to 10-n are classified into groups. The display information generator 23 generates, as the display information, a management screen of the air conditioners 10-1 to 10-n and operating state information of a specified air conditioner based on operation information detected by the operation detector 211. The communicator 24 communicates with the air conditioners 10-1 to 10-n, the tablet terminals 50-1 to 50-3, and the personal computer 50-4. The control information generator 25 generates operational control information of the air conditioners 10-1 to 10-n based on the operation information detected by the operation detector 211.

The tablet terminals 50-1 to 50-3 and the personal computer 50-4 transmit the operational control information for operational control to the air conditioners 10-1 to 10-n as required, and obtains and displays the operating state information of the air conditioners 10-1 to 10-n, through communication with the air conditioners 10-1 to 10-n via the controller 20.

Operations of Air Conditioning System According to Embodiment

Next, operations of the air conditioning system 1 according to the embodiment will be described. The air conditioning system 1 is installed in a large commercial facility. In the air conditioning system 1, the operational control information for controlling operations of the air conditioners 10-1 to 10-n is transmitted as required and the operating state information of the air conditioners 10-1 to 10-n is obtained and stored at prescribed time intervals by the controller 20.

Information in which the air conditioners 10-1 to 10-n are classified depending on the installation sites thereof into groups by stores or predetermined areas (such as a store A, a store B, a store C, a first floor center aisle area, and a first floor west aisle area) in the commercial facility equipped with the air conditioning system 1 is stored as the device classification information in the device classification information storage 22 of the controller 20.

An example of the device classification information is illustrated in FIG. 3. In the device classification information illustrated in FIG. 3, the air conditioners 10-1 to 10-5 correspond to a group indicating the air conditioners installed in a store A (a store A group), the air conditioners 10-6 to 10-10 correspond to a group indicating the air conditioners installed in a store B (a store B group), the air conditioners 10-11 to 10-15 correspond to a group indicating the air conditioners installed in a store C (a store C group), the air conditioners 10-16 to 10-18 correspond to a group indicating the air conditioners installed in a first floor center aisle area (a first floor center aisle area group), and the air conditioners 10-19 to 10-21 correspond to a group indicating the air conditioners installed in a first floor west aisle area (a first floor west aisle area group).

Figure 4A:
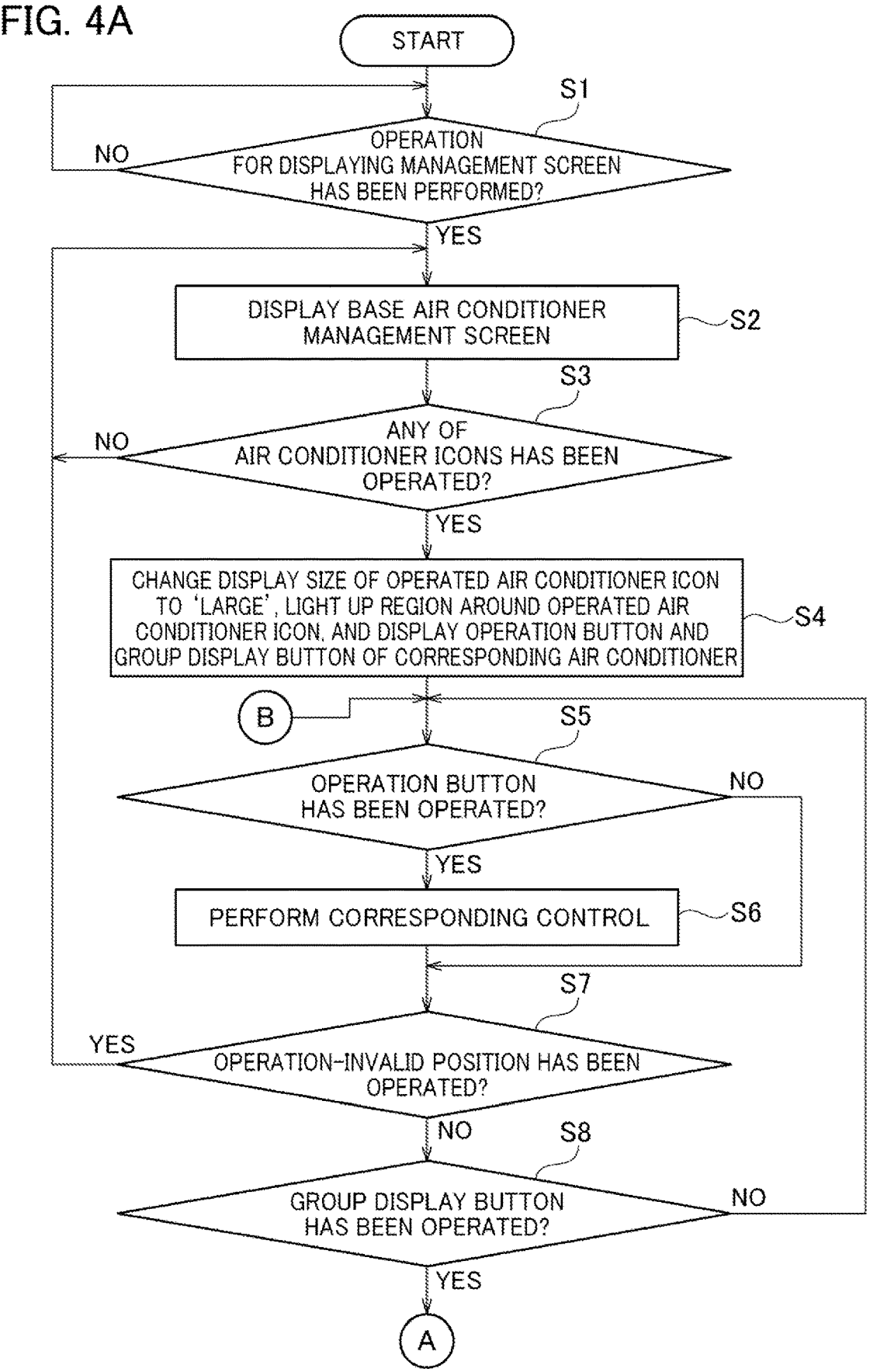
FIG. 4A is a flowchart of operations performed by the controller serving as the equipment management apparatus according to the embodiment.
Figure 4B:
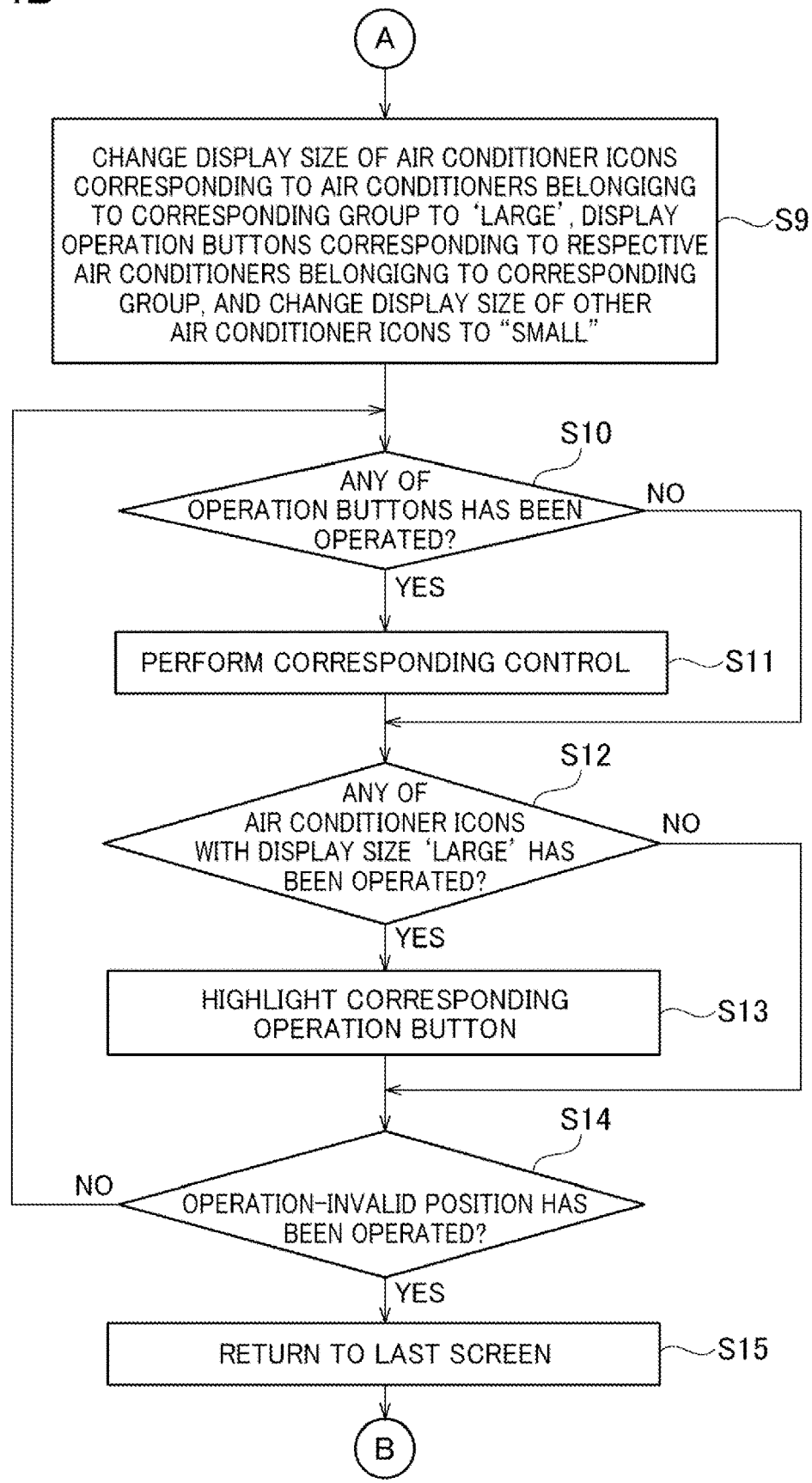
FIG. 4B is a flowchart of operations performed by the controller serving as the equipment management apparatus according to the embodiment.

The processing performed by the controller 20 when the manager of the air conditioners 10-1 to 10-n performs operations for management work for the air conditioners 10-1 to 10-n using the controller 20 will be described by referring to the flowchart of FIGS. 4A and 4B.

Figure 5:
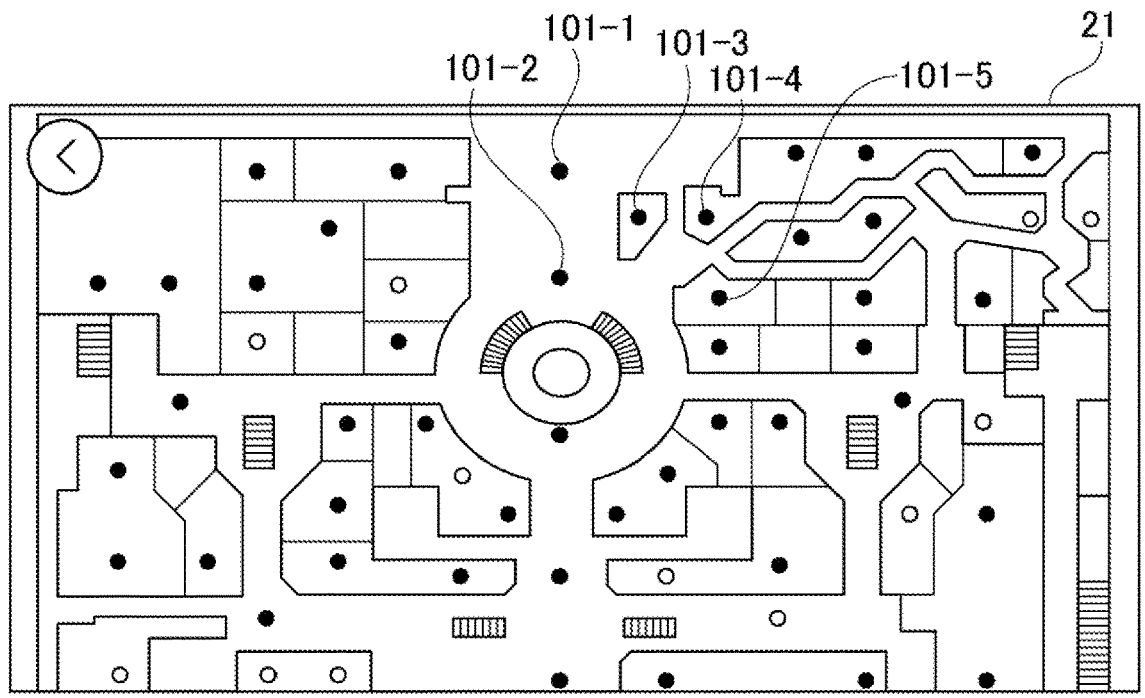
FIG. 5 is a screen configuration diagram of a base air conditioner management screen displayed on a touch panel of the controller serving as the equipment management apparatus according to the embodiment.

First, when the manager performs an operation of displaying the management screen of the air conditioners 10-1 to 10-n on the touch panel 21 of the controller 20 (step S1: YES), operation information is detected by the operation detector 211 and obtained by the display information generator 23. The display information generator 23 generates a base air conditioner management screen as a corresponding equipment management screen. In the base air conditioner management screen, air conditioner icons 101-1 to 101-n indicating the respective air conditioners and having a first display size "medium" are superimposed on a floor configuration diagram (floor layout diagram) of the building at positions corresponding to the installation sites of the respective air conditioners 10-1 to 10-n. The generated air conditioner management screen is displayed on the touch panel 21 by the display 212 as illustrated in FIG. 5, for example (step S2). In the air conditioner management screen illustrated in FIG. 5, the air conditioner icons that are solid black circles indicate power-on states of the corresponding air conditioners 10, and the air conditioner icons that are white circles indicate power-off states of the corresponding air conditioners 10.

When the manager performs a touch operation of any of the air conditioner icons, for example, the air conditioner icon 101-1 corresponding to the air conditioner 10-1 on the base air conditioner management screen displayed on the touch panel 21 (step S3: YES), operation information is detected by the operation detector 211 and obtained by the display information generator 23.

Figure 6:
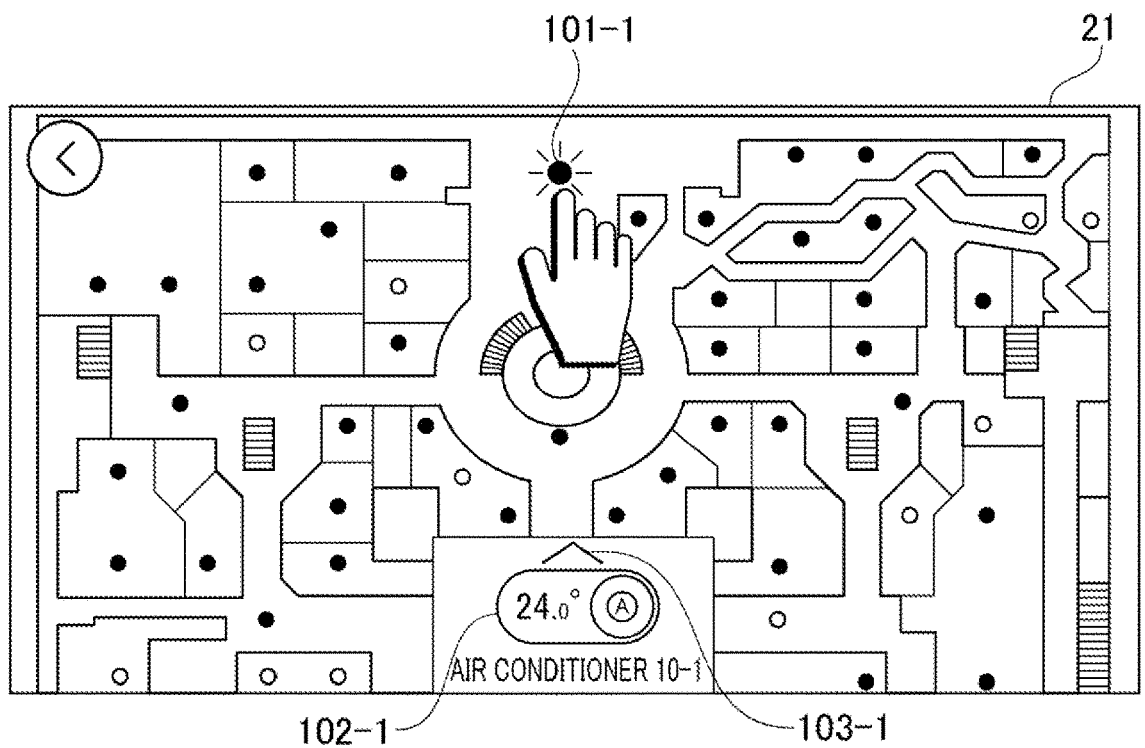
FIG. 6 is a screen configuration diagram in a state where an air conditioner icon having a first display size has been operated on an air conditioner management screen displayed on the touch panel of the controller serving as the equipment management apparatus according to the embodiment.

Upon obtaining information indicating detection of the touch operation of the air conditioner icon 101-1 on the touch panel 21, the display information generator 23 updates the display information such that the display size of the air conditioner icon 101-1 displayed on the air conditioner management screen is changed to a second display size "large" that is larger than the first display size, the air conditioner icon 101-1 is highlighted by lighting up the region therearound, and an operation button 102-1 for implementing operations and settings of the corresponding air conditioner 10-1 and a group display button 103-1 for instructing display of the group to which the air conditioner 10-1 belongs are displayed at the bottom of the air conditioner management screen in a superimposed manner. In the operation button 102-1, the current operating state (power-on state/power-off state) of the corresponding air conditioner 10-1 and setting information (set temperature or the like) are displayed. The generated display information of the air conditioner management screen is displayed on the touch panel 21 by the display 212 as illustrated in FIG. 6, for example (step S4).

When the manager performs an operation with respect to the operations and settings of the corresponding air conditioner 10-1, for example, a power-off operation by means of the operation button 102-1 on the base air conditioner management screen displayed on the touch panel 21 (step S5: YES), the operation is detected by the operation detector 211 and a power-off instruction for the corresponding air conditioner 10-1 is generated as control information by the control information generator 25. The generated control information is transmitted from the communicator 24 to the corresponding air conditioner 10-1, and the power state of the corresponding air conditioner 10-1 is turned to an off state (step S6).

When the manager performs an operation on an operation-invalid position on the air conditioner management screen displayed on the touch panel 21 (step S7: YES), the display information generator 23 returns the display size of the air conditioner icon 101-1 to the first display size "medium", terminates the lighting up of the region around the air conditioner icon 101-1, terminates the display of the operation button 102-1, and then returns the display of the touch panel 21 to the base air conditioner management screen by (step S2). Operation-invalid positions on the air conditioner management screen are positions other than the air conditioner icon 101-1 displayed at the second display size "large", the air conditioner icons 101-2 to 101-$n$ displayed at the first display size "medium" other than the air conditioner icon 101-1, the operation button 102-1, and the group display button 103-1.

Figure 7:
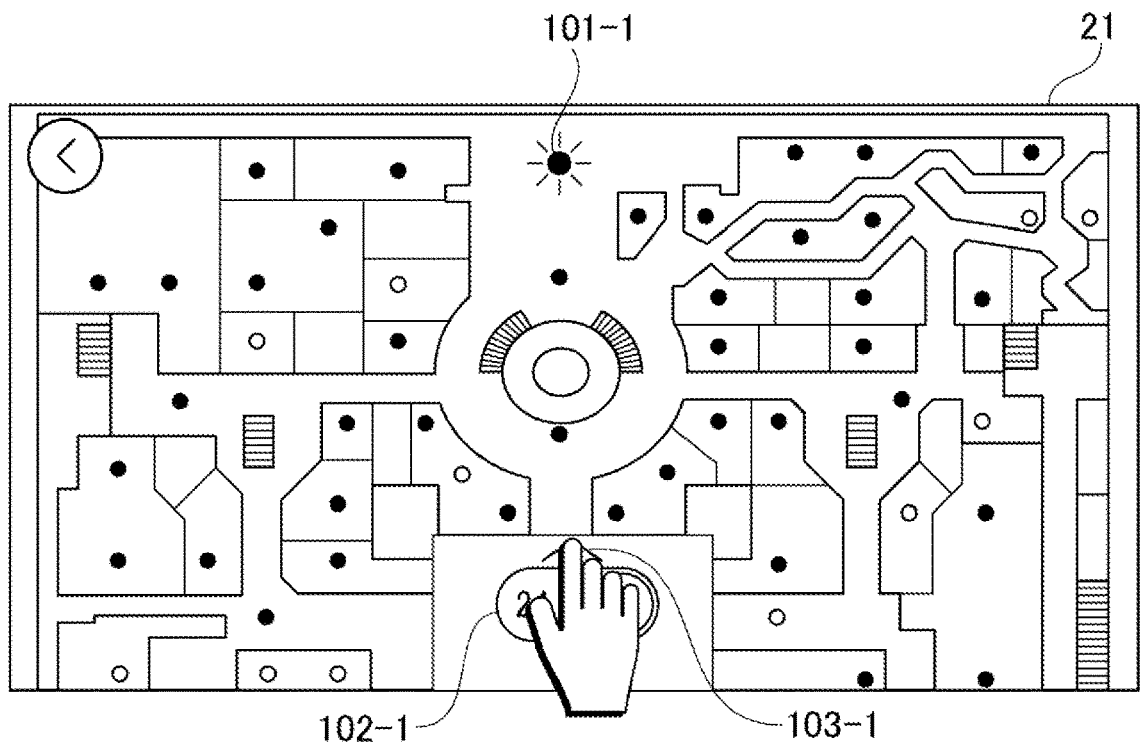
FIG. 7 is a screen configuration diagram in a state where a group display button of a desired air conditioner has been operated on the air conditioner management screen displayed on the touch panel of the controller serving as the equipment management apparatus according to the embodiment.

When the operation-invalid positions are not operated in step S7 (step S7: NO) and the group display button 103-1 is operated on the air conditioner management screen as illustrated in FIG. 7 (step S8: YES), the display information generator 23 identifies all the air conditioners 10-1 to 10-5 in the store A group to which the air conditioner 10-1 belongs based on the information stored in the device classification information storage 22.

Figure 8:
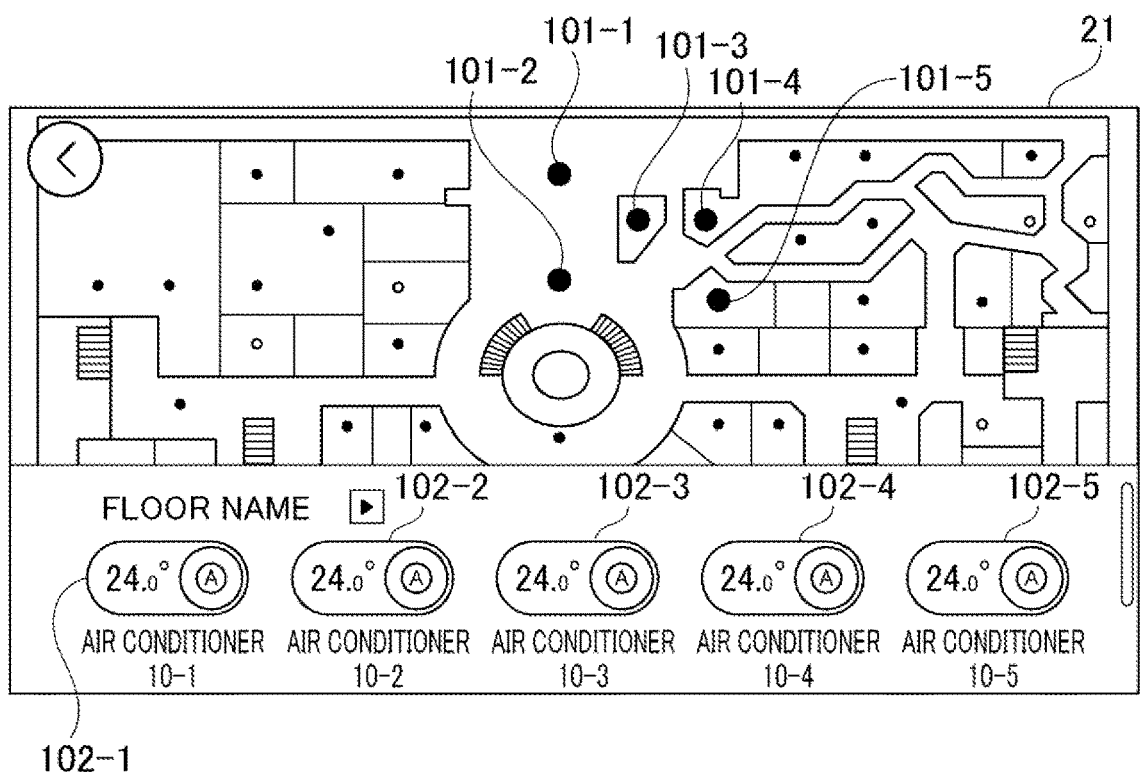
FIG. 8 is a screen configuration diagram in a state where operation buttons of a prescribed group are displayed on the air conditioner management screen displayed on the touch panel of the controller serving as the equipment management apparatus according to the embodiment.

Then, the display information generator 23 updates the display information such that the display size of the air conditioner icons 101-1 to 101-5 corresponding to the identified air conditioners 10-1 to 10-5 is changed to the second display size "large" that is larger than the first display size, the lighting up of the region around the air conditioner icon 101-1 is terminated, the operation buttons 102-1 to 102-5 for implementing the settings of the corresponding air conditioners 10-1 to 10-5 are displayed at the bottom of the air conditioner management screen, and the display size of the air conditioner icons 101-6 to 101-$n$ corresponding to the air conditioners 10-6 to 10-$n$ in the groups other than the store A group is changed to a third display size "small" that is smaller than the first display size. The updated air conditioner management screen is displayed on the touch panel 21 by the display 212 as illustrated in FIG. 8, for example (step S9).

When the manager operates any of the operation buttons, for example, the operation button 102-2 to perform an operation with respect to the operations and settings of the air conditioner 10-2 on the displayed air conditioner management screen (step S10: YES), the operation is detected by the operation detector 211 and the corresponding control information is generated by the control information generator 25. The generated control information is transmitted from the communicator 24 to the air conditioner 10-2, and the corresponding control is performed (step S11).

Figure 9:
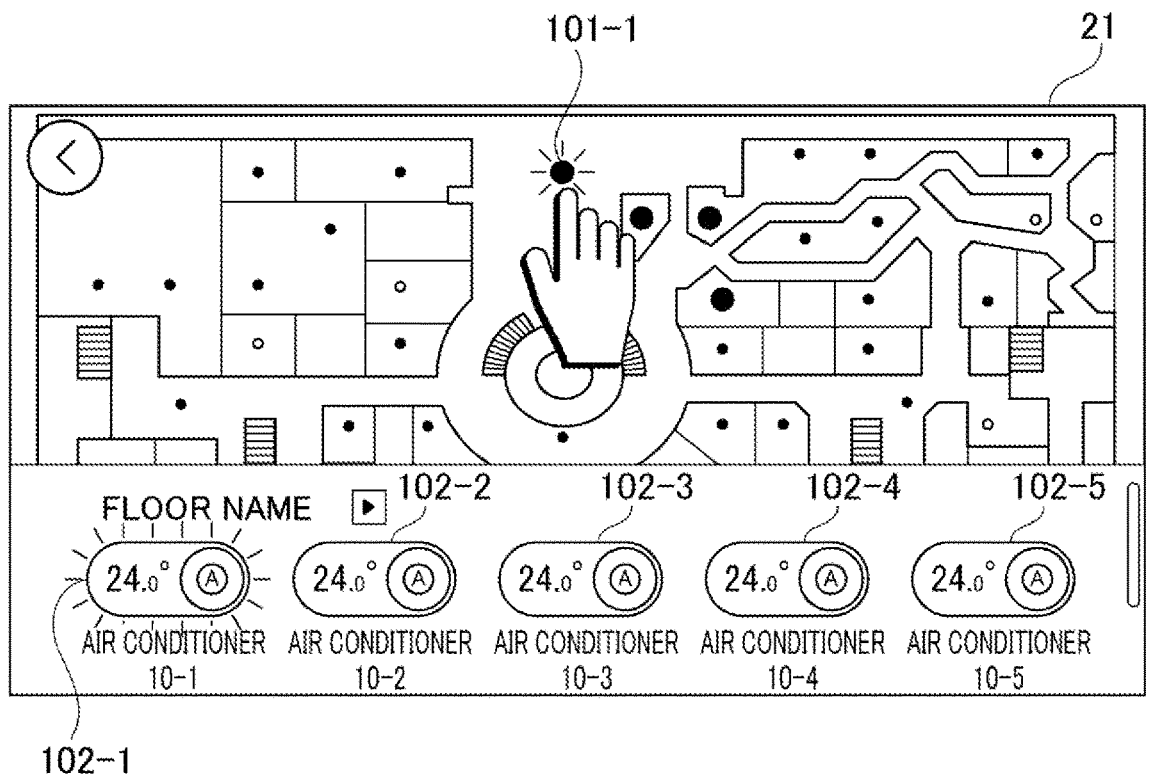
FIG. 9 is a screen configuration diagram in a state where an air conditioner icon having a second display size has been operated on the air conditioner management screen displayed on the touch panel of the controller serving as the equipment management apparatus according to the embodiment.

When the manager performs a touch operation of any of the air conditioner icons displayed at the second display size "large", for example, the air conditioner icon 101-1 on the displayed air conditioner management screen as illustrated in FIG. 9, the corresponding operation button 102-1 is highlighted by lighting up the region therearound (step S13). Thus, the manager can know the position of the operation button for performing an operation with respect to the operations and settings of the air conditioner located at the desired position in the floor configuration diagram.

When the manager performs an operation on an operation-invalid position described below on the displayed air conditioner management screen (step S14: YES), the display information generator 23 updates the display information such that the screen is returned to the immediately preceding screen, that is, the screen on which only the air conditioner icon 101-1 is displayed at the second display size "large" and highlighted by lighting up the region therearound and only the operation button 102-1 of the air conditioner 10-1 is displayed at the bottom of the screen. Then, the generated display information of the display information generator 23 is displayed on the touch panel 21 (step S15) and the processing returns to step S5.

In the air conditioner management screen displayed in step S9, the display information generator 23 determines that operations for the air conditioner icons 101-1 to 101-5 displayed at the second display size "large" and operations for all the displayed operation buttons 102-1 to 102-5 are valid, and determines that operations for the positions other than the aforementioned positions, for example, operations for the air conditioner icons 101-6 to 101-$n$ displayed at the third display size "small" are invalid.

According to the embodiment above, the manager can know how the air conditioners 10-1 to 10-$n$ in the building are classified and performs operations on the air conditioner management screen displayed on the touch panel 21. Thus, in a case where it is agreed that all the air conditioners in a prescribed store in the building are to be turned to a power-off state at a prescribed store closing time every day, the manager can know the air conditioner(s) for which a power off operation has not been performed and can perform a power-off operation therefor with an easy operation by displaying the operation buttons of the air conditioners in the store after the prescribed store closing time. Accordingly, it is possible to improve the operability of management operations of equipment devices in a large building on the touch panel 21.

Figure 10:
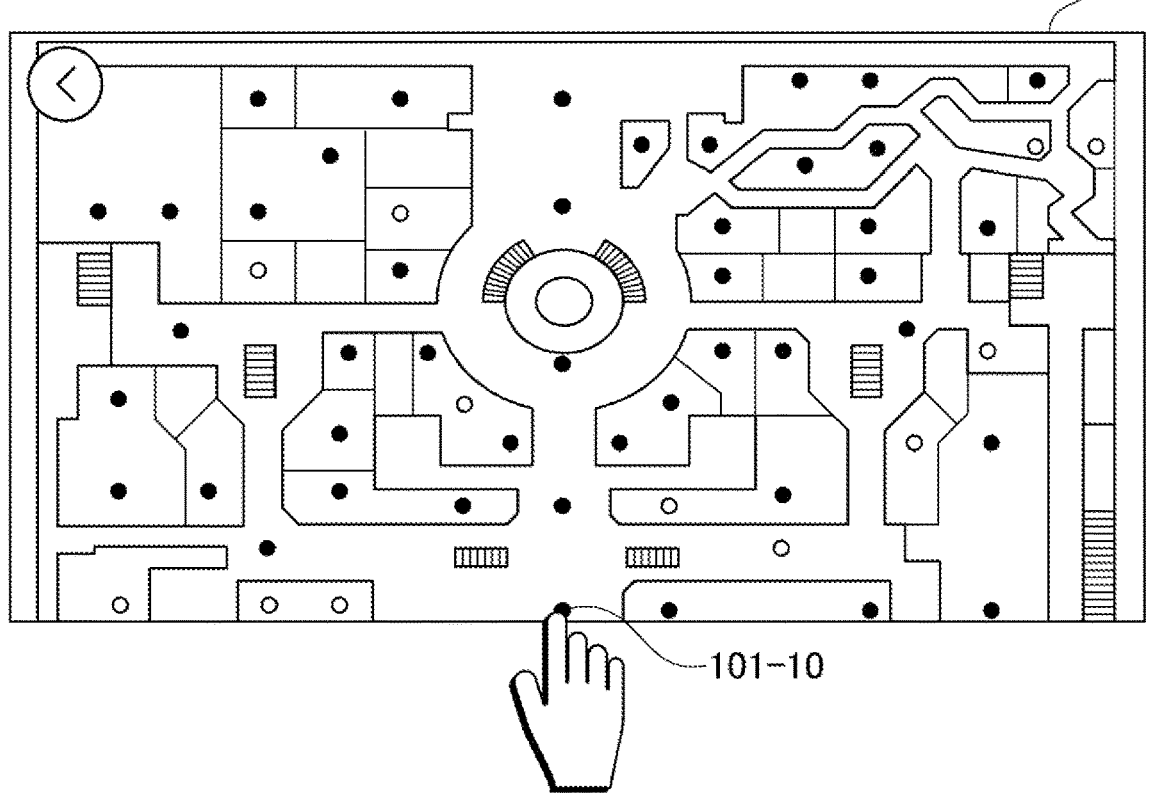
FIG. 10 is a screen configuration diagram in a state where an air conditioner icon displayed at the bottom of the screen has been operated on the air conditioner management screen displayed on the touch panel of the controller serving as the equipment management apparatus according to the embodiment.
Figure 11:
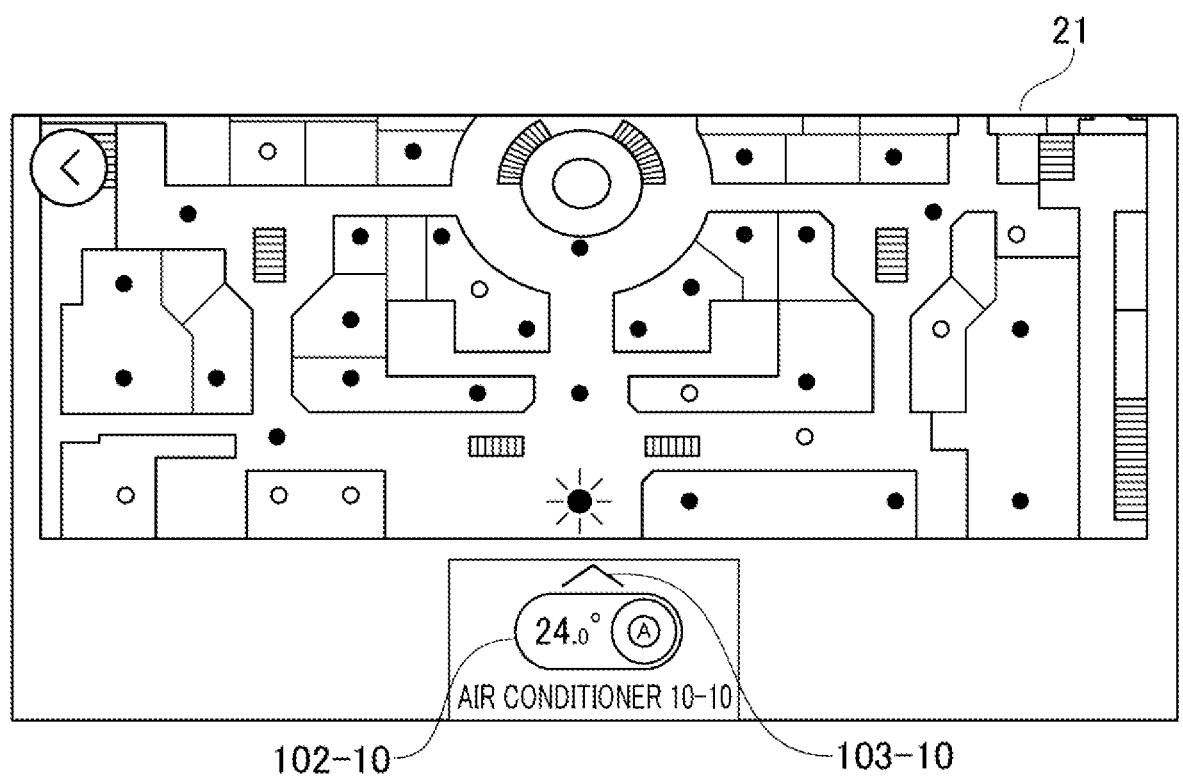
FIG. 11 is a screen configuration diagram in a state where an operation button is displayed after the air conditioner icon displayed at the bottom of the screen has been operated on the air conditioner management screen displayed on the touch panel of the controller serving as the equipment management apparatus according to the embodiment.

In the embodiment above, when an air conditioner icon displayed at the bottom of the air conditioner management screen, for example, the air conditioner icon 101-10 illustrated in FIG. 10, is operated in step S3, and the operation button 102-10 and the group display button 103-10 are displayed at the bottom of the screen in a superimposed manner, the air conditioner icon 101-10 may be hidden by the display of the buttons in a superimposed manner and thus may not be visible. In this case, as illustrated in FIG. 11, the portion corresponding to the floor configuration diagram may be displaced to the upper side of the screen such that the operated air conditioner icon 101-10 can be reliably displayed on the screen even when the operation button 102-10 and the group display button 103-10 are displayed. Also in a case where the group display button 103 is operated in step S8 and the operation buttons corresponding to the group are displayed, when any of the air conditioner icons displayed at the second display size "large" may be hidden by the display of the buttons in a superimposed manner, the portion corresponding to the floor configuration diagram may be similarly displaced to the upper side of the screen.

In the embodiment, an example is described in which the equipment devices are air conditioners, the equipment management apparatus is a controller which manages these air conditioners, and the equipment management screen is an air conditioner management screen. However, the equipment devices are not limited to air conditioners and may be elevators, lights, machine tools, and combinations thereof, for example. The equipment management screen may be any screen as long as, in the screen, equipment device icons indicating the respective equipment devices to be managed are superimposed on a floor configuration diagram (floor layout diagram) of a building at positions corresponding to the installation sites of the respective equipment devices. The equipment management apparatus is not limited to a controller and may be a communication device with a touch screen such as the tablet terminal 50-3 and the personal computer 50-4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An equipment management apparatus comprising:
a display configured to display an equipment management screen in which icons indicating equipment devices and having a first display size are superimposed on a floor configuration diagram of a building at positions corresponding to installation sites of the equipment devices;
an operation detector configured to detect an operation on the equipment management screen displayed on the display;
a device classification information storage configured to store device classification information in which the equipment devices are classified into groups; and
a display information generator configured to
upon detection by the operation detector of an operation of one of icons indicating the equipment devices on the equipment management screen displayed on the display, change a display size of the operated icon from a first display size to a second display size larger than the first display size, and display an operation button for implementing settings of the equipment device at a prescribed position on the equipment management screen in a superimposed manner, and
upon detection by the operation detector of an operation of specifying display of a group to which the equipment device corresponding to the operated icon belongs, identify all equipment devices belonging to the specified group based on the device classification information stored in the device classification information storage, change display sizes of icons corresponding to the identified equipment devices to the second display size, display operation buttons for implementing settings of the identified equipment devices at prescribed positions on the equipment management screen in a superimposed manner, and change display sizes of icons corresponding to equipment devices not belonging to the specified group to a third display size smaller than the first display size.

2. The equipment management apparatus according to claim 1, wherein, upon detection by the operation detector of an operation of any of the icons of the equipment devices belonging to the specified group being displayed at the second display size on the equipment management screen displayed on the display, the display information generator configured to highlight the operated operation button.

3. The equipment management apparatus according to claim 1, wherein the display information generator is configured to
determine that operations on the icons displayed on the equipment management screen at the first display size or the second display size and operations on all the displayed operation buttons are valid, and determine that operations on positions other than the icons displayed at the first display size or the second display size and the displayed operation buttons are invalid, and
upon an operation determined as invalid being performed during display of the icons corresponding to the equipment devices belonging to the specified group on the equipment management screen, return to a screen displayed prior to specifying display of the specified group.

4. The equipment management apparatus according to claim 1, wherein, upon displaying the operation buttons on the equipment management screen in a superimposed manner, the display information generator is configured to display the equipment management screen to be displaced so as not to hide the icons displayed at the second display size.

5. An equipment management screen generating method performed by an equipment management apparatus,
the equipment management apparatus comprising:
a display configured to display an equipment management screen in which icons indicating equipment devices and having a first display size are superimposed on a floor configuration diagram of a building at positions corresponding to installation sites of the equipment devices;

an operation detector configured to detect an operation on the equipment management screen displayed on the display; and a device classification information storage configured to store device classification information in which the equipment devices are classified into groups, the method comprising:

upon detection by the operation detector of an operation of one of icons indicating the equipment devices on the equipment management screen displayed on the display, changing a display size of the operated icon from a first display size to a second display size larger than the first display size, and displaying an operation button for implementing settings of the equipment device at a prescribed position on the equipment management screen in a superimposed manner; and upon detection by the operation detector of an operation of specifying display of a group to which the equipment device corresponding to the operated icon belongs, identifying all equipment devices belonging to the specified group based on the device classification information stored in the device classification information storage, changing display sizes of icons corresponding to the identified equipment devices to the second display size, displaying operation buttons for implementing settings of the identified equipment devices at prescribed positions on the equipment management screen in a superimposed manner, and changing display sizes of icons corresponding to equipment devices not belonging to the specified group to a third display size smaller than the first display size.

* * * * *